J. P. TIERNEY & L. CSERNAI.
HOSE CONNECTION.
APPLICATION FILED FEB. 12, 1910.
1,046,901.
Patented Dec. 10, 1912.
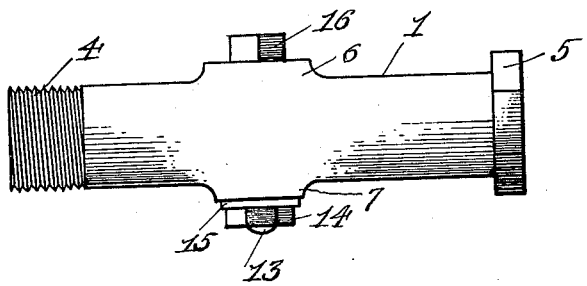
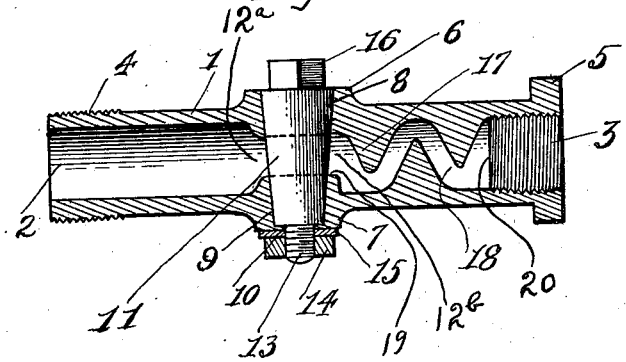
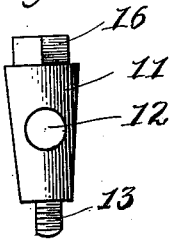
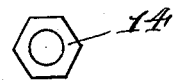
Witnesses
Inventors.
J. P. Tierney and L. Csernai,
Attorneys
COLUMBIA PLANOGRAPH CO., WASHINGTON, D. C.

UNITED STATES PATENT OFFICE.

JOHN P. TIERNEY AND LOUIS CSERNAI, OF YOUNGSTOWN, OHIO.

HOSE CONNECTION.

1,046,901.  Specification of Letters Patent.  Patented Dec. 10, 1912.

Application filed February 12, 1910. Serial No. 543,628.

*To all whom it may concern:*

Be it known that we, (1) JOHN P. TIERNEY and (2) LOUIS CSERNAI, (1) a citizen of the United States, (2) a subject of the King of Hungary, residing at Youngstown, in the county of Mahoning and State of Ohio, have invented certain new and useful Improvements in Hose Connections, of which the following is a specification, reference being had therein to the accompanying drawing.

This invention relates to valves for use in connection with high pressure systems and the object thereof is to provide a valve of such class with means in a manner as hereinafter set forth to increase the life of the hose which is coupled to the valve. In this connection it will be stated that the form of valves now generally employed in high pressure systems are so constructed that the fluid after passing through the valvular element impacts with the full force thereof against the inner face of the hose, such action tearing the lining of the hose and also buckling the hose at the joint of the valve, under such conditions the life of the hose is very short and necessitates the constant replacing of a length of hose which, as is obvious, is very expensive.

To overcome the foregoing objection and to obtain a great saving in expense in connection with the hose when using high pressure systems is the primary object of this invention and to this end the invention aims to provide a valve construction with means whereby the fluid after it passes through the valvular element of the valve will first enter a buffing or deflecting means whereby the fluid will be guided in such manner as to not impact directly with all of its force against the lining of the tubing, under such conditions increasing the life of the hose, as damage to the lining and the buckling of the hose is reduced to a minimum.

Further objects of the invention are to provide a valve for high pressure systems which shall be simple in its construction and arrangement, strong, durable, containing the advantages set forth, convenient in its use, readily set up in operative position with respect to the hose, and comparatively inexpensive to manufacture.

With the foregoing and other objects in view the invention consists in the novel construction, combination and arrangement of parts as hereinafter more specifically described and illustrated in the accompanying drawings, wherein is shown the preferred embodiment of the invention, but it is to be understood that changes, variations, and modifications can be resorted to which come within the scope of the claims hereunto appended.

In describing the invention in detail reference is had to the accompanying drawings wherein like reference characters denote corresponding parts throughout the several views, in which:—

Figure 1 is an elevation of a valve for use in connection with high pressure systems and in accordance with this invention, Fig. 2 is a longitudinal sectional view, the valvular element or member being shown in elevation, Fig. 3 is an elevation of the valvular element or member shown at right angles with respect to the showing of said element or member in Fig. 2, and Figs. 4 and 5 are details respectively of the washer and securing nut.

Referring to the drawings by reference characters, 1 denotes a tubular valve casing provided with an inlet 2 and an outlet 3. The inlet end of the valve casing 1 is peripherally threaded as at 4 for the connecting of the casing with a feed pipe. The outlet end of the casing 1 is interiorly threaded for the reception of a suitable coupling (not shown) whereby the hose (not shown) can be attached to the outlet end of the casing 1. The outlet end of the casing 1 is furthermore provided with a laterally-extending hexagonal flange 5 employed in connection with a suitable tool or implement for rotating the casing when setting it up with respect to the hose and the feed pipe.

The valve casing 1 is formed approximately centrally with oppositely disposed enlarged portions 6, 7 the former having a tapering opening 8 which communicates with the interior of the casing 1 and the latter is formed with a tapering recess 9 having its bottom wall provided with an opening 10. Mounted in the casing 1 is a tapering valvular element or plug 11 formed centrally with a passage 12 for establishing communication between the ports $12^a$ and $12^b$, the former being positioned at the inner end of the inlet side of the casing and the latter being positioned at the inner end of the outlet side of the casing. The ports $12^a$ and $12^b$ are of much less diameter than the inner diameter of the inlet side of the casing 1. The plug 11 extends through the opening 8 and through the interior of the casing 1 and is seated in the recess 9. The plug 11 snugly engages the wall of the opening 8 and also the wall of the recess 9, and the engagement is such as not to prevent the shifting or turning of the plug when occasion so requires. Formed integral with the lower end of the plug 11 and extending through the opening 10 is a screw-threaded projection 13 carrying on its outer end a nut 14 for connecting the plug to the casing 1. Interposed between the nut 14 and the enlarged portion 7 and surrounding the projection 13 is a washer 15. The other end of the plug 10 is formed with a squared stem 16 for the reception of a suitable tool or implement when it is desired to turn the plug to open position or to closed position when occasion so requires.

The inner face of the casing 1 at the outlet side thereof is formed with an integral deflector 17 in proximity to the port 12$^b$ and is furthermore provided with a tortuous passage 18 of reduced diameter with respect to the inner diameter of the casing 1 at the inlet side thereof and also of reduced diameter with respect to the ports 12$^a$ and 12$^b$. The passage 18 establishes communication between the inner end 19 of the outlet side of the casing 1 and the outer end 20 of the outlet side of the casing 1. The passage 18 is of less diameter than the inner terminus or the outer terminus of the outlet portion of the casing 1, and constitutes, in connection with the deflector 17, a buffing or deflecting means to prevent the fluid, after it passes through the port 12, from impacting directly with its full force against the lining of the hose, and under such conditions damage to the interior of the hose or the buckling of the hose is reduced to a minimum whereby the life of the hose is materially increased.

From the foregoing construction and arrangement of parts it is evident when plug 11 is shifted to establish communication between the inlet and outlet sides of the valve casing 1, that the fluid after passing through the port 12 will engage the deflector 17, then travel through the passage 18, and thence into the portion of enlarged diameter at the outer end of the outlet portion of the casing, and under such conditions the full force of the fluid will not impact directly against the inner face of the hose.

What we claim is:

1. A valve for high pressure systems comprising a valve casing having the intermediate portion thereof constituting a plug seat and the portions at each side of the intermediate portion constituting respectively an inner portion and an outer portion, the inner terminus of the inlet and outlet portions each being provided with a port of less diameter than the remaining part of the inlet portion, a turning plug mounted in the intermediate portion of the valve stem and provided with a passage of the same diameter as said ports, and adapted when shifted in one direction to establish communication between said ports, said outlet portion further provided with a deflector arranged opposite to the port at the inner end of the outlet portion, and said outlet portion further provided with a tortuous passage of less diameter than either one of said ports, the inner diameter at the outer end of said outlet portion being greater than the diameter of said tortuous passage or either of said ports the outlet end of said casing having means to permit attachment of a hose section.

2. A valve for high pressure systems comprising a valve casing having the intermediate portion thereof constituting a plug seat and the portions at each side of the intermediate portion constituting respectively an inner portion and an outer portion, the inner terminus of the inlet and outlet portions each being provided with a port of less diameter than the remaining part of the inlet portion, a turning plug mounted in the intermediate portion of the valve stem and provided with a passage of the same diameter as said ports and adapted when shifted in one direction to establish communication between said ports, said outlet portion further provided with a deflector arranged opposite to the port at the inner end of the outlet portion, and said outlet portion further provided with a tortuous passage of less diameter than either one of said ports, the inner diameter at the outer end of said outlet portion being greater than the diameter of said tortuous passage or either of said ports, said valve casing having the inner portion thereof peripherally threaded and the outlet portion at the outer end thereof interiorly threaded and formed of a peripheral flange the outlet end of said casing having means to permit attachment of a hose section.

3. A valve for high pressure systems comprising a valve casing having the intermediate portion thereof constituting a plug seat and the portions at each side of the intermediate portion constituting respectively an inner portion and an outer portion, the inner terminus of the inlet and outlet portions each being provided with a port of less diameter than the remaining part of the inlet portion, a turning plug mounted in the intermediate portion of the valve stem and provided with a passage of the same diameter as said ports, and adapted when shifted in one direction to establish communication between said ports, said outlet portion further provided with a deflector arranged opposite to the port at the inner end of the outlet portion, and said outlet portion further provided with a tortuous passage of less diameter than either one of said ports, the inner diameter at the outer end of said outlet portion being greater than the diameter of said tortuous passage or either of said ports, said turning plug at one end projecting from the valve casing to permit of manually shifting the plug, and said plug at its other end provided with a threaded protuberance extending from the casing, and means mounted upon the threaded protubearance for securing the plug in the valve casing the outlet end of said casing having means to permit attachment of a hose section.

4. A valve structure for high pressure systems comprising a casing having a turning plug and also having inlet and outlet ports leading to and from said plug, the outlet port including a tortuous passage way of permanent form the outlet end of said casing having means to permit attachment of a hose section.

5. A valve structure for high pressure systems comprising a casing having a turning plug and also having inlet and outlet ports leading to and from said plug, the outlet port including a tortuous passage way of permanent form leading from the turning plug toward the outlet end of the casing the outlet end of said casing having means to permit attachment of a hose section.

6. A valve structure for high pressure systems comprising a casing having a turning plug and also having inlet and outlet ports leading to and from said plug, the outlet port including a tortuous passage way of permanent form leading from the turning plug toward the outlet end of the casing, said passage way having a cross sectional area approximating the similar area of the opening of the turning plug the outlet end of said casing having means to permit attachment of a hose section.

7. As a means for increasing the life of hose sections in high pressure systems, a valve structure positioned in advance of the section being protected, said structure comprising a casing having a turning plug and also having inlet and outlet ports leading to and from said plug, the outlet port including a tortuous passage way of permanent form, and means at the outlet end of the casing for permitting attachment of a hose section.

8. As a means for increasing the life of hose sections in high pressure systems, a valve structure positioned in advance of the section being protected, said structure comprising a casing having a turning plug and also having inlet and outlet ports leading to and from said plug, the outlet port including a tortuous passage way of permanent form leading from the turning plug toward the outlet end of the casing, and means at the outlet end of the casing for the attachment of the hose section being protected.

In testimony whereof we affix our signatures in the presence of two witnesses.

JOHN P. TIERNEY.
LOUIS CSERNAI.

Witnesses:
W. G. DORNAN,
THOS. H. JENKINS.

---

Copies of this patent may be obtained for five cents each, by addressing the "Commissioner of Patents, Washington, D. C."